ELECTROLYTE AND METHOD FOR ANODIZING FILM FORMING METALS

Filed July 11, 1966

INVENTOR
A. J. HARENDZA-HARINXMA
BY MARN & JANGARATHIS
ATTORNEY

United States Patent Office 3,445,353

Patented May 20, 1969

3,445,353

ELECTROLYTE AND METHOD FOR ANODIZING FILM FORMING METALS

Alfred J. Harendza-Harinxma, Trenton, N.J., assignor to Western Electric Company, Incorporated, New York, N.Y., a corporation of New York Filed July 11, 1966, Ser. No. 564,332
Int. Cl. C23b *9/00;* H01g *1/01*
U.S. Cl. 204—56 10 Claims This invention relates generally to electrolyte compositions and, more particularly, the invention relates to viscous electrolyte compositions useful in anodization and plating. The electrolyte compositions of the invention are characterized by their long-lasting, gel-like consistency, by the even, controllable oxide and metallic films which they produce and by the ease with which they can be handled.

Figure 3:
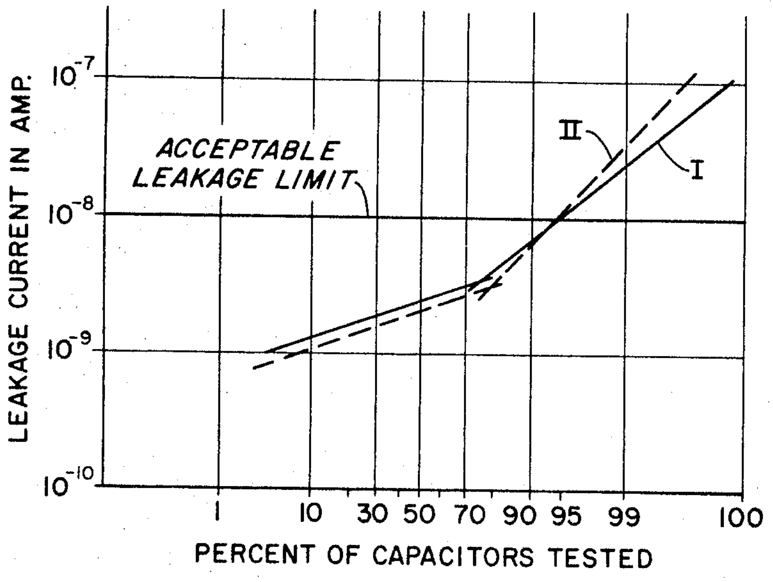

Anodic oxidation is a process wherein a film forming metal (tantalum, aluminum, titanium, niobium, etc.) is made the anode is an electrolytic cell and a surface portion of the metal is oxidized by the electrolytic action. Common electrolytes for this process are solutions of chromic, sulfuric, citric, tartaric and phosphoric acids. Plating electrolytes are also well known.

Oxide films produced in this manner can be very thin (a few thousand angstroms) and such thin films are essentially transparent to visible light. Being thinner than the wave-length of light, however, colors appear due to optical interference between light reflected from the upper surface of the film and light reflected from the underlying metal substrate. As the film becomes thicker during anodization, the interference colors run through the entire spectrum.

A more industrially significant application of anodizing is in the production of electronic components and circuits and, more especially, thin-film circuits. Such circuits comprise combinations of conductors, semiconductors and insulators in thin films and complex patterns (as used herein, the term "thin film" is intended to mean about 10,000 A. or less). The complex patterns are produced in part by etching, i.e., actual removal of the material down to the substrate, partly by anodizing, which forms an oxide layer having dielectric or very high resistance properties, depending on the type and thickness of the oxide, and in part by plating. Etching, anodizing and plating all require the use of suitable masks so that the chemical action caused by the electrolyte or etchant takes place only where desired (i.e. outside or inside the desired pattern) and for this purpose either photosensitive or screened resists are applied. After etching, anodizing or plating the resist is removed with a suitable solvent.

In carrying out anodizing operations, either a constant voltage or a constant current technique is employed. In the constant voltage technique, the voltage is stepped up to close to the peak voltage very quickly (about 10 minutes) and is then held constant. The current gradually drops off over a longer period (about 60–70 minutes) after which anodization is complete. For example, in anodizing a 3,000 A. tantalum film with the electrolyte of the present invention, the voltage can be brought up step-wise to about 190 volts, with the current being kept in the range of 15–35 milliamps per $cm.^2$. With the voltage held constant, the current will drop down to about 1.5 microamps per $cm.^2$ in about 80 minutes, and the result will be a $Ta_2O_5$ film of about 2,000–3,000 A. thickness.

With the constant current technique, the current is maintained at a constant, low level while the voltage increases with the oxide thickness. When a voltage indicative of a desired oxide thickness is reached, the voltage is held constant at this value for a time sufficient to provide equalization of the oxide thickness.

As noted above, acidic solutions are the conventional electrolytes. A proper understanding of the benefits achieved by the present invention for either anodizing or plating requires some discussion of the problems inherent in the use of these liquids.

Any free-flowing liquid electrolyte suffers certain serious defects. Thus, surface tension causes liquids to "creep" up the surface of the metal away from the liquid surface. This produces an uneven line of demarcation between anodized and metal surfaces, and the oxide thickness in this region is uneven. Also, unless fluid is enclosed by a boot or some other protective device, waves on the electrolyte surface will produce current surges due to the contact of electrolyte with unanodized metal. These waves will be caused by vibration, air currents etc. and are most difficult to avoid. Lastly, at high voltages and low, final anodizing currents there is a tendency toward excessive anodizing activity at the surface of the electrolyte, which can result in the complete isolation of the metallic area directly beneath this region (i.e. the entire metal film thickness is anodized). Similar problems afflict plating electrolytes, but the end result is an uneven plated surface as opposed to a poorly anodized surface.

There are other problems inherent in these liquid electrolytes which are not associated with surface effects. In particular, anodization at higher voltages is highly destructive of most commercially available resists, both photo-sensitive and screened. This places an upper limit on film thickness which can be attained under pattern-forming conditions. Also, hydrogen bubbles often form on the surface of the anode, inhibiting proper oxide formation. Lastly, it is often necessary to apply a reverse voltage, or "back etch" to the metal in order to remove impurity materials from the surface, which materials will not anodize and will thus cause excessive leakage across the film. These impurities are present due to imperfect cleaning procedures.

It is a general object of the present invention to provide electrolyte compositions which overcome all of the foregoing problems of conventional electrolytes.

A further object of the present invention is to provide an electrolyte which does not attack resists, even at very high voltages.

A still further object of this invention is to provide an electrolyte which does not exhibit "creep" and which is insensitive to vibrations.

Yet another object of the present invention is to provide an electrolyte which eliminates hydrogen bubble formation and which removes impurities without the need of back-etching.

Still another object of this invention is to provide an electrolyte which produces an extremely uniform anodized or plated coating but which requires no elaborate care or equipment to use.

Various other objects and advantages of the invention will become clear in the course of the following description of several embodiments thereof, and the novel features will be particularly pointed out in connection with the appended claims.

In essence, the present invention accomplishes all of the foregoing objects by the provision of an electrolyte of controllable viscosity which is comprised of an alkali metal silicate, glyoxal and an inorganic stabilizer. For plating purposes, a metal salt is added. Sodium silicate ("water glass") is the material of choice for the first ingredient, due to its ready availability and low cost. The commercially available 40% aqueous solution is adequate. Glyoxal, a dialdehyde of formula CHO—CHO, is available as a 30% aqueous solution. As stabilizers, a variety of oxygen-bearing hygroscopic metal compounds can be employed. Manganous nitrate is one excellent material. Another good stabilizer is what is believed to be a mixture of manganese phosphates, phosphides and phosphites of the general formula $MnH_xPO_y$ produced by boiling phosphoric acid and manganous nitrate to dryness. Phosphoric acid per se is not as good but is still satisfactory.

The ratio of glyoxal to sodium silicate is of the order of 1:1 to 3:1. In general the concentration of sodium silicate in the final solution should be below about 10%. The stabilizer is added in relatively minor amounts, but its concentration is not critical. The primary function of the stabilizer is to prevent the viscous electrolyte from drying too fast by attracting additional moisture from the air. Concentration effects are set forth in detail in the examples hereinbelow.

It has been long known that aqueous sodium silicate will form a quick setting cement by adding thereto the salt of a metal other than an alkali metal (i.e. aluminum, zinc, cadmium or iron). An unstable gel forms if the solution is quite dilute. More recently in U.S. Patent No. 3,028,340, assigned to Societe Nobel Bozel (France), it was determined that hydrosols stable up to several days could be obtained by mixing sodium silicate with glyoxal in proportions ranging from 8 to 1 to 1 to 2, the more stable gels having the higher glyoxal content. These gels are used for coating papers, for preparing soil, making foundry cores, and as fillers and bonding agents in rubber latex. Such gels are of no use as viscous electrolytes as once the gel has formed it can no longer be readily removed with water, which is a most desirable property.

Neither the aforementioned patent nor the other literature in the art give any indication of the nature of the reaction between glyoxal and sodium silicate. It is to be noted, however, that while the formula for glyoxal is given as CHO—CHO, it is generally agreed that, in solution, it exists as a series of hydrated forms which are in equilibrium with each other. These may be defined by the following formulae:

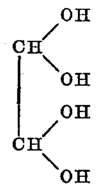

tetrahydroxyethane (I)

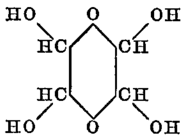

tetrahydroxydioxane (II)

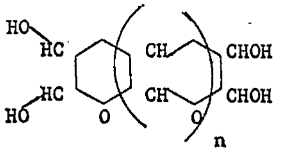

polyglyoxal (III)

Thus, it will be noted that all three ingredients of the composition hold water, and that all three ingredients themselves contain oxygen. As oxygen for the anodizing reaction must come from the electrolyte, this composition is clearly a rich source thereof. Further, it is known that when glyoxal is mixed with a dilute alkali solution, an internal Cannizzaro reaction takes place, producing salts of glycolic acid and the corresponding alcohol. Such a reaction is not impossible in the present instance.

In its preferred form, the compositions of the invention have the consistency which may be characterized by equating it with thin paste, soft butter or "apple butter," and the term "viscous" is used to connote approximately such a consistency. More importantly, the electrolyte will keep this consistency for a period of 4 hours, more than sufficient time to complete anodization. This is important, as once such material hardens or forms an insoluble gel it can not be rinsed off with water. It will be obvious to those skilled in the art that an electrolyte of this consistency overcomes all of the problems associated with surface effects of fluid electrolytes (sensitivity to vibrations, "creep," uneven oxide formation or plating, etc.). Moreover, the viscous electrolytes of the present invention may themselves be screened and formed into patterns, thus eliminating at least in part the need for resists. Where very fine edge definition is required, however, it is still desirable to employ a resist. Contrary to fluid electrolytes, the viscous electrolyte can be used with either photosensitive or screened resists at high voltages without damage to the resist. Tests have been carried out with both kinds of resists at up to 200 volts for as long as two hours without harm to either kind.

One of the most interesting features of the viscous electrolytes is that there is no apparent formation of hydrogen bubbles. This indicates that either the oxygen donor is something other than the water or that the hydrogen immediately becomes attached to another group in the electrolyte. The mechanism is not known, but the lack of such bubbles is of course a substantial advantage.

Back-etching with these viscous electrolytes is not required, as impurities are apparently "burned" off the metal surface automatically. Again the mechanism is not known.

As the electrolyte covers only the area being anodized, it is possible to measure the resistance of the material being anodized or plated while the process is being carried out. This gives a very accurate method of measuring oxide or metal film thickness.

Preparation and use of the electrolyte are simple and trouble-free. The ingredients are mixed at room temperature and the mixture assumes the proper consistency in a matter of seconds. It can be screened using conventional procedures or, where screening is not necessary, it can be brushed on or spread with a spatula. As long as the electrolyte has a reasonably uniform thickness, the thickness of the film will be uniform.

Connection to the power supply is made by any convenient method. After usage, the electrolyte is removed by washing with water. Of course, standard procedures to insure cleanliness are observed at all stages of operation.

Figure 1:
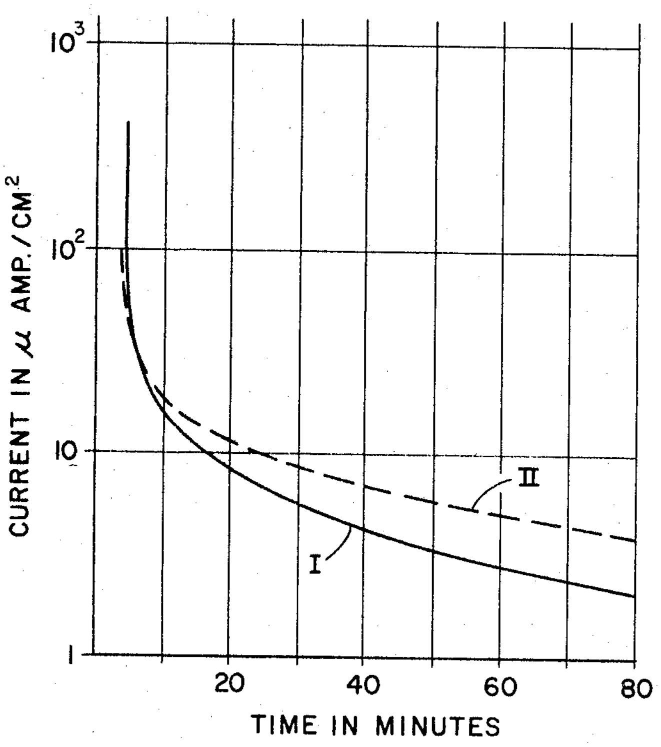
Figure 2:
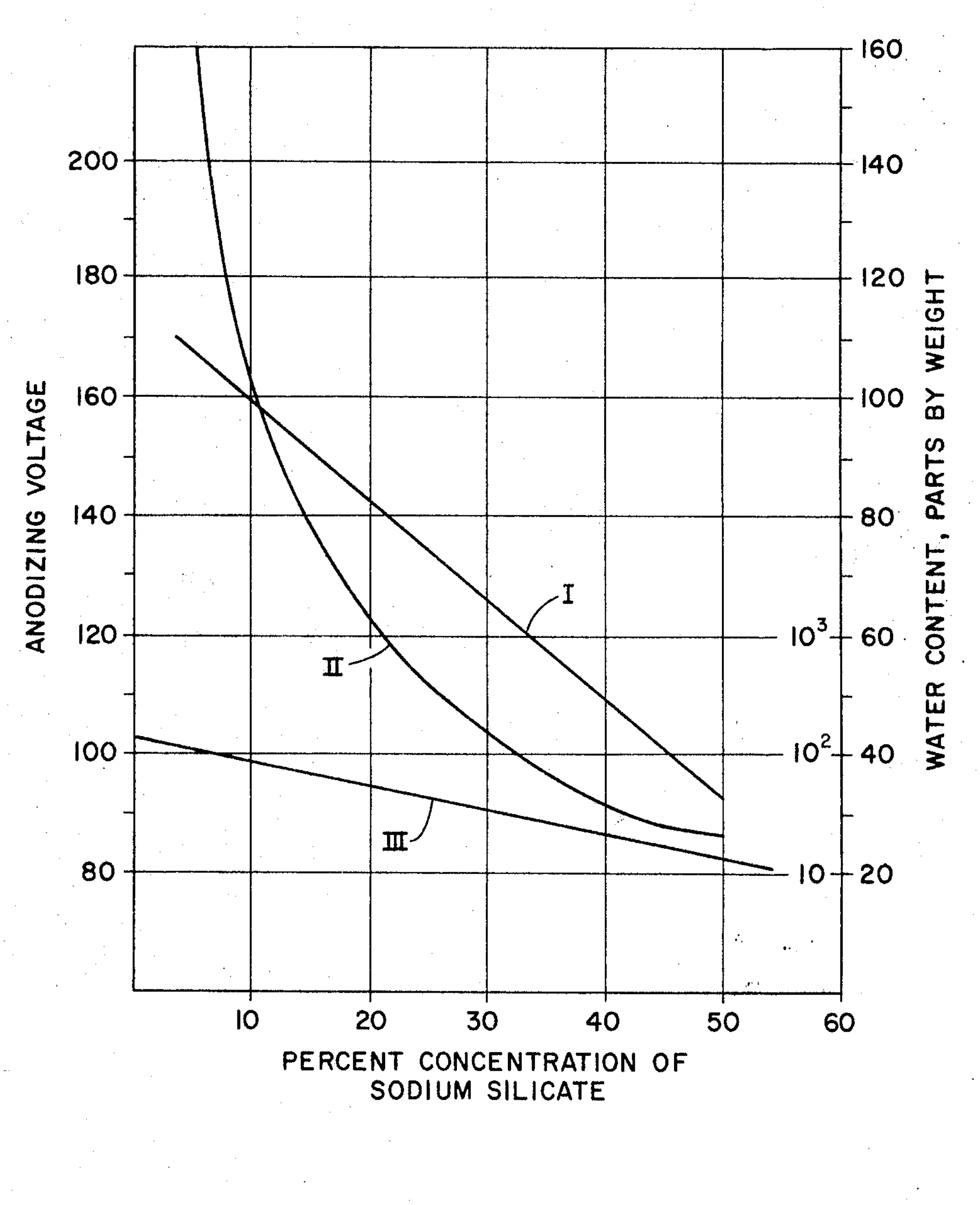

Understanding of the invention will be facilitated by referring to the specific examples thereof set forth below, together with the accompanying drawings, wherein FIGURE 1 shows anodizing curves for two viscous electrolytes, FIGURE 2 illustrates the effect of sodium silicate and water contents on anodizing voltage, and FIGURE 3 is a plot of leakage current for capacitors anodized with conventional and viscous electrolytes.

Example I

| Electrolyte composition: | Grams |
|---|---|
| Glyoxal (30% solution) | 100 |
| Sodium silicate (40% solution) | 36 |
| $MnH_xPO_y$ stabilizer | 0.8 |

The stabilizer was prepared by combining 50% by volume of 85.5% phosphoric acid with 50% by volume of 51.1% manganous nitrate, boiling the mixture to dryness (at about 260° C.) and grinding the residue to a fine powder. The powder is very hygroscopic and its primary function is to keep the electrolyte from drying out too fast.

The electrolyte was applied with a knife to a slide having a uniform vacuum deposited coating of tantalum 4,500 A. thick, which had been etched in a capacitor T-pattern. Connection to the power supply was made with alligator clips, one to clean (uncoated) tantalum and the other to the electrolyte over uncoated glass. Anodization voltage was raised in 10 volt increments until a peak voltage of 160 volts was reached. This took about 10 minutes. Voltage was held constant at 160 volts for about 70 minutes, and the current gradually dropped down to below 1.5 microamps per cm.$^2$ Standard measurements indicated a $Ta_2O_5$ film thickness of about 2,000 A. An anodizing curve for this electrolyte is shown as curve I in FIGURE 1.

Example II

| Electrolyte composition: | Grams |
|---|---|
| Glyoxal (30% solution) | 100 |
| Sodium silicate (40% solution) | 36 |
| Manganous nitrate | 2 |

Procedures followed were the same in Example I, and the anodization curve is illustrated in curve II in FIGURE 1, from which it can be seen that anodization proceeded at a somewhat faster rate.

In both Examples I and II, the sodium silicate used was old and concentration was not known with precision. This led to the tests of Example III.

Example III

The effect of the total water content on the electrolyte was determined. This was done by preparing five electrolytes containing a constant amout of glyoxal and varying the solution concentration of the sodium silicate. The total amount of sodium silicate (non-aqueous basis) was kept roughly constant. The five electrolytes were then each used in several tests and the mean peak anodizing voltage was determined. The electrolyte compositions are set forth hereinbelow in Table I, and the results are illustrated graphically in FIGURE 2. As the addition of hydroscopic stabilizers would have varied the water content during the tests, none were used.

TABLE II

| Stabilizer, grams: | Mean voltage |
|---|---|
| 0.15 | 175 |
| 0.3 | 190 |
| 0.45 | 185 |
| 0.9 | 180 |
| 3.0 | 175 |

As can be seen from these results, the amount of the stabilizer is not significant, but its presence does have a beneficial effect, ranging from 10 to 25 volt increase in anodizing voltage. The concentration of the stabilizer ranged roughly from 0.1 to 2% (1 to 18% on a non-aqueous basis).

Example V

The use of electrolytes as described herein would be of no significance, in spite of their improved properties as electrolytes, if the quality of the anodized film produced was not satisfactory. To establish this fact, a total of 640 thin-film capacitors were made by depositing tantalum on a glass slide and etching in an appropriate T-pattern (32 capacitors per slide), anodizing and sputtering a gold counter-electrode thereover. Half of the capacitors were anodized with a viscous electrolyte in accordance with the present invention and half were anodized with a conventional citric acid electrolyte; the other steps were identical. All of the capacitors were then tested for capacitance and leakage current in the conventional fashion. Capacitance of both groups was in the range of 0.0104 to 0.0109 microfarad. Acceptable 0.01 microfarad capacitors should have a leakage current of less than $10^{-8}$ amperes at 75 volts, and the results are shown in FIGURE 3, where leakage current is plotted against the percent of capacitors tested. Curve I is for the viscous elcetrolyte capacitors and curve II is for the citric acid capacitors. As is clear from FIGURE 3, leakage current for the two groups is practically identical (94.5% acceptable for the citric acid group versus 95.6% acceptable for the viscous electrolyte group). Capacitors produced with the present electrolyte are thus seen to be entirely satisfactory.

TABLE I

| Electrolyte | Glyoxal Grams | Glyoxal Percent solution | Sodium Silicate Grams | Sodium Silicate Percent solution | Weight Percent CHO-CHO | Weight Percent $Na_2O.SiO_2$ | Weight Percent $H_2O$ | Mean voltage |
|---|---|---|---|---|---|---|---|---|
| 1 | 29.5 | 30 | 143.6 | 4 | 5.2 | 3.3 | 91.5 | 172.5 |
| 2 | 29.5 | 30 | 108.9 | 10 | 6.4 | 7.9 | 85.7 | 160 |
| 3 | 29.5 | 30 | 52.1 | 20 | 10.8 | 12.8 | 76.4 | 142.5 |
| 4 | 29.5 | 30 | 29.2 | 30 | 15.1 | 14.7 | 70.2 | 125 |
| 5 | 29.5 | 30 | 11.9 | 50 | 21.4 | 14.3 | 64.4 | 92.5 |

As can be seen from Table I, the mean voltage dropped off in rough proportion to the total amount of water in the solution. This is illustrated graphically in FIGURE 2, where voltage versus sodium silicate solution concentration is plotted in curve I. The drop in water content with increase in sodium silicate is plotted on a linear scale, curve II, and on a logarithmic scale, curve III. The important conclusion to be drawn from this test is that the concentration of water (total) in the electrolyte should be at least 50% for a workable electrolyte, and for an electrolyte which is useful at high anodizing voltages, the water content should be 80–90%. Similarly, the silicate content of the electrolyte should not be higher than 10–12% for best results. The glyoxal content did not seem to be critical as long as the other limits were observed, running generally from 5–20%. The glyoxal:silicate ratio was in the approximate range of 1:1 to 3:1.

Example IV

In these tests, it was established that the amount of stabilizer added had no significant effect on the mean anodizing voltage. Five electrolytes were prepared, each containing 29.5 grams of 30% glyoxal and about 125 grams of 6% sodium silicate. Such an electrolyte should have an anodizing voltage of about 165 volts, according to curve I of FIGURE 2. Varying amounts of the $$MnH_xPO_y$$

stabilizer, prepared as described in Example I, were added to these electrolytes. Results are tabulated in Table II.

Example VI

It is often desirable to electroplate patterned areas, just like anodizing. This is ordinarily done in a plating bath involving a fluid electrolyte and a suitable resist, which suffers from the same drawbacks as fluid anodizing electrolytes.

To test the applicability of the electrolyte of the present invention to a plating situation, an electrolyte of the approximate composition of that set forth in Example II was made up, but a substantial quantity of saturated copper sulfate solution was added to the glyoxal before mixing with the other ingredients. The electrolyte was spread on a gold film evaporated on a nichrome (81% nickel, 19% chromium) coated glass substrate and connected to a power supply for plating (as opposed to anodizing). After an appropriate period, a 12,000 A. layer of dense copper was deposited. Concentration of the $CuSO_4$ was not found to be critical, although it should be as high as possible, since it represents the source of ions to be plated. Saturating the glyoxal with $CuSO_4$ before mixing the electrolyte is a convenient way to insure an adequate supply of copper ions. It was found that addition of either a strong base or acid (NaOH or $H_2SO_4$) improved the results, undoubtedly by providing more ions within the electrolyte.

Various changes in the details, steps and materials, which have been herein described and illustrated in order to explain the nature of the invention, may be made by those skilled in the art within the principle and scope of the invention as expressed in the appended claims.

What is claimed is:

1. An electrolyte composition consisting essentially of:
an alkali metal silicate,
glyoxal,
at least 50 weight percent water, and
a minor proportion of an inorganic, hygroscopic stabilizer;
the proportions of said silicate, glyoxal and water being controlled to produce a viscous, relatively stable material.

2. A viscous electrolyte comprising approximately:
an amount up to 12 weight percent sodium silicate,
5 to 20 weight percent glyoxal,
50 to 90 weight percent water, and
an amount up to 2 weight percent of an inorganic, hygroscopic stabilizer.

3. The electrolyte composition as claimed in claim 2, wherein said silicate and said glyoxal are in the form of aqueous solutions, said solutions accounting for said water.

4. A viscous electrolyte composition characterized by a buttery consistency, good conductivity and inertness to resists at high anodizing voltages, said composition consisting essentially of:
an amount up to 12 weight percent sodium silicate,
5 to 20 weight percent glyoxal,
80 to 90 weight percent water, and
an amount up to 2 weight percent of a stabilizer selected from the group consisting of manganous nitrate, manganese phosphates and phosphoric acid.

5. The electrolyte composition as claimed in claim 4, wherein said stabilizer comprises the powdered residue resulting from boiling a mixture of manganous nitrate and phosphoric acid to dryness.

6. A viscous, electrolyte composition consisting essentially of:

an amount less than 15 weight percent sodium silicate,
an amount less than 15 weight percent glyoxal,
at least 70 weight percent water, and
a minor proportion of an inorganic, hygroscopic stabilizer.

7. The electrolyte composition as claimed in claim 6, wherein said stabilizer is selected from the group consisting of manganous nitrate, manganese phosphates and phosphoric acid.

8. A composition of matter consisting essentially of the reaction product of sodium silicate, glyoxal and at least 50 weight percent water, and a minor proportion of an inorganic, hygroscopic stabilizer, the proportions of said silicate, glyoxal and water being controlled to provide a viscous consistency.

9. The method of anodically oxidizing a film forming metal comprising:
covering the area of said metal to be anodized with a viscous electrolyte comprising an alkali metal silicate, glyoxal and at least 50 weight percent water;
connecting said metal as the anode in an electrolytic cell; and
passing a current through said metal and said electrolyte.

10. The method of anodically oxidizing a film forming metal comprising:
covering the area of said metal to be anodized with a viscous electrolyte comprising an amount up to 15 weight percent sodium silicate, 5 to 20 weight percent glyoxal and 50 to 90 weight percent water;
connecting said metal as the anode in an electrolytic cell; and
passing a current through said metal and said electrolyte.

References Cited

UNITED STATES PATENTS

| | | | |
|---|---|---|---|
| 1,748,011 | 2/1930 | Dooley | 252—62.2 |
| 2,560,792 | 7/1951 | Gibney | 204—56 XR |
| 3,028,340 | 4/1962 | Gandon et al. | 252—313 |

JOHN H. MACK, *Primary Examiner.*

G. L. KAPLAN, *Assistant Examiner.*

U.S. Cl. X.R.

204—45, 58, 52; 252—62.2; 317—230